(12) United States Patent
Rusnack et al.

(10) Patent No.: US 6,577,408 B1
(45) Date of Patent: Jun. 10, 2003

(54) METHOD AND APPARATUS FOR CORRECTING BLUE DRIFT IN AN IMAGE SCANNER

(75) Inventors: Michael R. Rusnack, Boise, ID (US); Ronald C. Slutz, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/244,806

(22) Filed: Feb. 5, 1999

(51) Int. Cl.[7] ............... G06F 15/00; G03F 3/08; G06K 9/00
(52) U.S. Cl. ............ 358/1.9; 358/518; 382/167
(58) Field of Search .............. 358/1.9, 518, 515, 358/505, 516; 382/167, 162

(56) References Cited

U.S. PATENT DOCUMENTS

| | | | | |
|---|---|---|---|---|
| 4,038,685 A | * | 7/1977 | Bazin | 358/32 |
| 4,415,925 A | * | 11/1983 | Tamura | 358/75 |
| 4,935,809 A | * | 6/1990 | Hayashi et al. | 358/76 |
| 4,994,901 A | * | 2/1991 | Parulski et al. | 358/76 |
| 5,233,413 A | * | 8/1993 | Fuchsberger | 358/80 |
| 5,289,295 A | * | 2/1994 | Yumiba et al. | 358/518 |
| 5,341,228 A | * | 8/1994 | Parker et al. | 358/534 |
| 5,357,352 A | * | 10/1994 | Eschbach | 358/518 |
| 5,371,615 A | * | 12/1994 | Eschbach | 358/515 |
| 5,386,229 A | * | 1/1995 | Suzuki | 348/227 |
| 5,570,129 A | * | 10/1996 | Hafele et al. | 348/223 |
| 5,621,479 A | * | 4/1997 | Akiyama | 348/648 |
| 5,737,032 A | * | 4/1998 | Stenzel et al. | 348/649 |
| 5,781,709 A | * | 7/1998 | Usami et al. | 395/109 |
| 5,867,285 A | * | 2/1999 | Hirota et al. | 358/522 |
| 5,986,718 A | * | 11/1999 | Barwacz et al. | 348/592 |
| 6,037,947 A | * | 3/2000 | Nelson et al. | 345/426 |
| 6,115,022 A | * | 9/2000 | Mayer, III et al. | 345/112 |

* cited by examiner

*Primary Examiner*—Madeleine Nguyen

(57) ABSTRACT

The method of the invention corrects for a color shift in a color scan mechanism. The method initially senses plural component color data that is derived from the color scan mechanism. A determination is made of whether at least one color component value exhibits a value that exceeds a first threshold. The method also determines if another color component exhibits a value that exceeds a second threshold. If it is determined that both of the color components exceed the respective thresholds, then the one color component value is altered to a predetermined desired color value, so as to correct for color shift.

16 Claims, 2 Drawing Sheets

METHOD AND APPARATUS FOR CORRECTING BLUE DRIFT IN AN IMAGE SCANNER

FIELD OF THE INVENTION

This invention relates to image scanners and, more particularly, to a method and apparatus for enabling automatic correction of blue drift which can occur in scanned image data acquired during a scan action.

BACKGROUND OF THE INVENTION

Currently, many image scanners employ cold cathode fluorescent bulbs as a light source. During a scan action, relative movement between the fluorescent light source and a document being scanned enables capture of the image data from the document. Full color scanners enable acquisition of red, green and blue data during the scan action. A scanner that is capable of scanning a full color image can take up to 8 minutes to complete a scan of a single page due to the large amounts of color data which must be accumulated. For instance, during such a scan, each pixel is represented by (for example) 24 bits of data. By contrast, a black/white image only requires one bit per pixel.

Cold cathode fluorescent lamps inherently exhibit a blue shift in their light spectrum when they are powered for more than several minutes. Thus, during a scan of a full color image (which, as indicated above, can take up to 8 minutes), a significant blue shift can and does occur in the light output spectrum of the fluorescent lamp, which blue shift is detected by the light sensors within the scanner. Such blue shift causes an unwanted blue hue in white background areas of a scanned image, among other color anomalies.

The prior art, in attempting to correct the blue shift phenomenon found in scanners, has attempted to modify the scan head structure to compensate for the blue drift. Such a modification widens the scan region seen by the color sensors and includes a calibration strip. The scanned calibration strip data provides known color values which are used to adjust or compensate the scanned image data when blue drift occurs. Such a solution adds additional expense to the scanning mechanism and is subject to error if the calibration strip becomes occluded via deposited dust.

Accordingly, there is a need for method and apparatus which corrects for blue drift and which avoids the need for modifications to scanner structures.

Further, such method and apparatus should enable the blue drift correction in such a manner as to be independent of calibration strips and the like.

SUMMARY OF THE INVENTION

The method of the invention corrects for a color shift in a color scan mechanism. The method initially senses plural component color data that is derived from the color scan mechanism. A determination is made of whether at least one color component value exhibits a value that exceeds a first threshold. The method also determines if another color component exhibits a value that exceeds a second threshold. If it is determined that both of the color components exceed the respective thresholds, then the one color component value is altered to a predetermined desired color value, so as to correct for color shift.

DETAILED DESCRIPTION OF THE INVENTION

As indicated above, color digital data output from red, green and blue sensors in a scanner comprise red, green and blue color component values. In the example to be described below, it will be assumed that each color component is comprised of 8 bits, enabling 0–255 color component values. A full color value is comprised of three consecutive 8-bit bytes called an RGB triplet, with a triplet value of 255,255,255 being pure white, and 0,0,0 being pure black.

A drift to blue occurs when the fluorescent light source in the scan head overheats, resulting in a drop-out in the red channel, (e.g., R=242, G=255, B=255). This causes a shift in the white color towards cyan and is most noticeable in the white. It has been determined that the shift from a full white value of 255 is the result of a drop-out in the red channel, with the green and blue channels being unaffected. Accordingly, it has been determined that if such a condition is sensed, i.e., a red channel drop-out, which causes the red value to drop below a threshold value, that a blue shift is occurring. Under such conditions, as will be understood from the detailed description below, Applicants' invention forces the red value back to a maximum value (e.g., 255), thereby correcting the shift.

Figure 1:
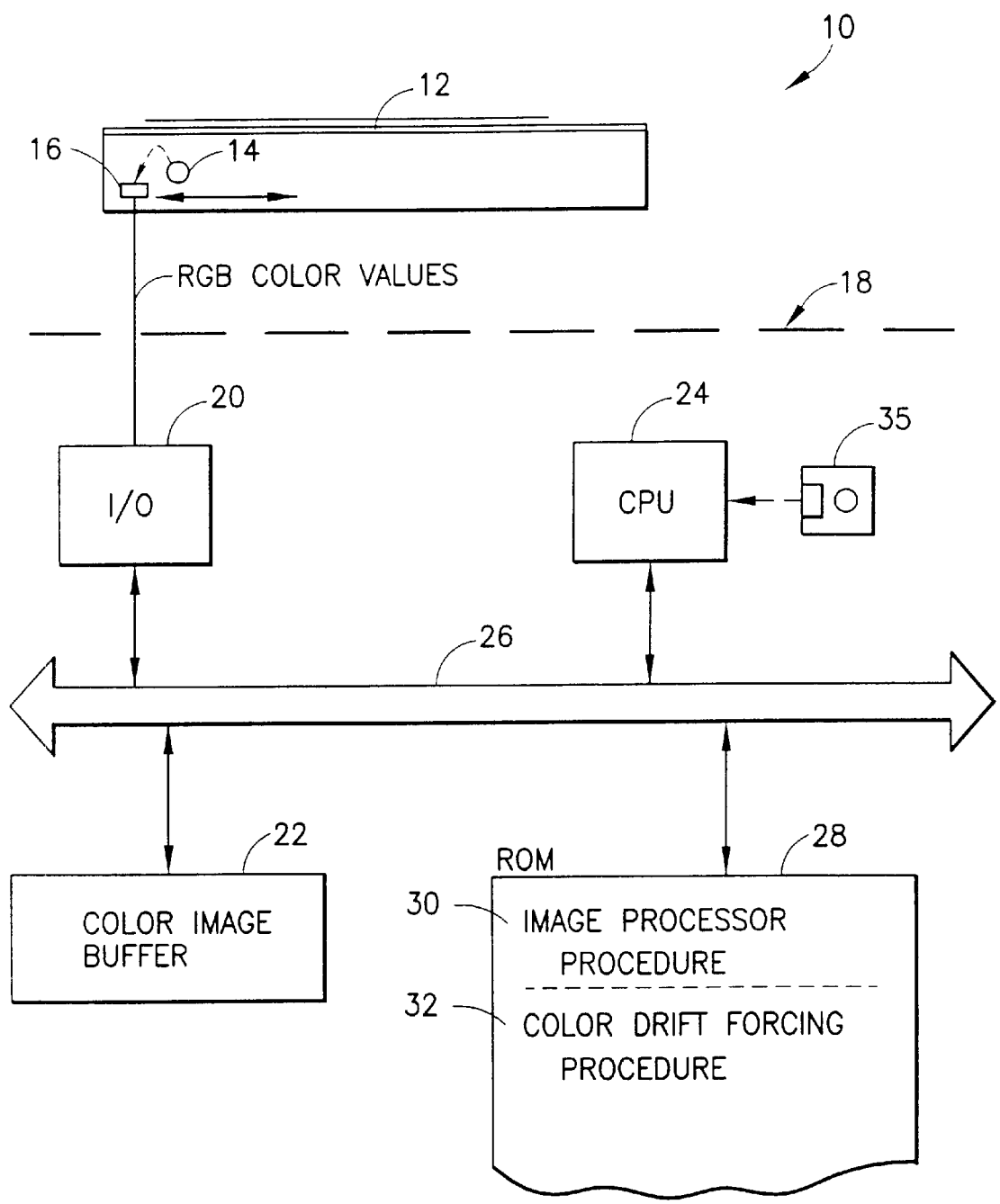
FIG. 1 is a block diagram of a scanner system adapted to implement the invention.

Turning now to FIG. 1, a scanner 10 includes a platen 12 on which a document to be scanned is placed. A light source 14 and color detector system 16 are moved beneath platen 12 to enable a scanning to occur of the document on platen 12. It is to be understood that the described structure of scanner 10 is only exemplary, as other scanners cause the document to move relative to a fixed scanner/sensor mechanism.

Sensed red, green and blue color values are output from sensor 16 to a computer 18 and, via an input/output module 20 into a color image buffer 22. A central processing unit (CPU) 24 is coupled, via a bus system 26, to both a color image buffer 22 and a read-only memory (ROM) 28. Within ROM 28 resides an Image processor procedure 30 which is adapted to convert the sensed color data into image data that is suitable for further processing.

Image processor procedure 30 includes a color drift forcing procedure 32 which detects the red, green and blue values of each pixel and, under conditions to be described, reverses any color drift which occurs as a result of, for instance, an overheating of light source 14.

Note that while it is assumed that each of the controlling procedures to be further described below are assumed to be already present within computer 18, they may be instead, stored on a memory media, such as magnetic diskette 35 shown in FIG. 1. Then, on an as-needed basis the controlling code may be downloaded into a memory within computer 18.

Figure 2:
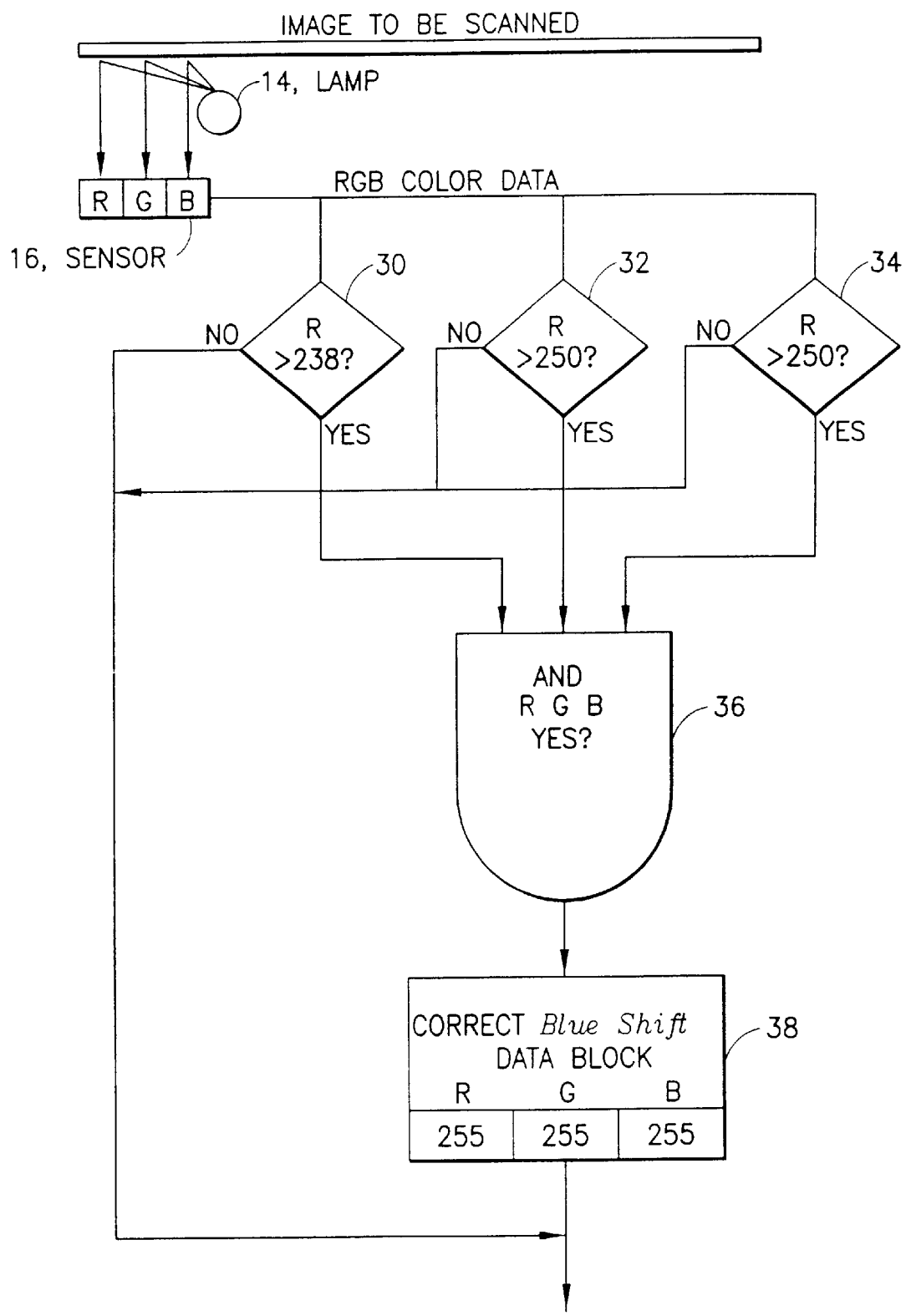
FIG. 2 is a logic flow diagram that illustrates the procedure of the invention.

Turning now to FIG. 2, further details of color drift forcing procedure 32 will be described. As indicated above, relative movement between lamp 14 and a document image on platen 12 causes RGB triplet values to be acquired by sensor 16. Those RGB triplet values are buffered in color image buffer 22 (FIG. 1) and are then processed by color drift forcing procedure 32. That procedure initially determines a digital value of the red, green and blue components of each RGB triplet.

Color drift forcing procedure 32 is provided with individual R, G and B threshold values which must be respectively exceeded before the color forcing action of the invention occurs. The individual color threshold values to be discussed below (and that are shown in FIG. 2) are provided merely for exemplary purposes. One skilled in the art will realize that other threshold values may be set, depending upon the desired levels at which the color drift correction action is to be invoked.

In this instance, as shown by decision steps 30, 32 and 34, the R, G and B threshold parameter values are 238, 250 and 250, respectively. (This, of course, assumes that each color component is represented as an eight-bit byte). Thus, if a pixel's green and blue color component values exceed threshold values of 250, and the pixel's red color component value exceeds a color value of, for instance, 238, then it is assumed that the pixel color is actually white, rather than the slightly blue hue which would be created by the respective color component values.

Step 36 is shown as an AND function and responds to each of decision steps 30, 32 and 34 issuing yes indications, to output an enable signal to "correct blue shift data" block 38. Upon receiving such an enable signal, correct blue shift data block 38 outputs a color triplet comprising the values 255, 255, 255 for the respective R, G and B color components.

As can be seen from the above, the procedure of the invention forces maximum R, G and B values to be output from correct blue shift data block 38 even when the inputs from color sensors 16 indicate otherwise, but respectively exceed the RGB threshold values shown in decision steps 30, 32 and 34. If any one of decision steps 30, 32 or 34 determines that the indicated threshold has not been exceeded, then the entire process is bypassed and the color values are accepted, as is.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for correcting a color shift resulting from a color scan mechanism, comprising the steps of:
   a. sensing plural component color data derived from said color scan mechanism;
   b. determining if at least one color component value exhibits a value greater than a first threshold value;
   c. determining if another color component value exhibits a value greater than at least another threshold value;
   d. if determining steps b) and c) determine that said at least one color component value exceeds said first threshold value and said another color component value exceeds said another threshold value, altering said at least one color component value to a predetermined color value so as to correct for said color shift; and
   e. wherein the value of the another color component is changed to the predetermined color value which comprises a fixed value which is independent of the plural component color data during the altering.

2. The method as recited in claim 1 wherein said plural color component data comprises bytes of red, green and blue color component values.

3. The method as recited in claim 1 wherein said at least one color component is a red color component.

4. The method as recited in claim 1 wherein said first threshold value is different from said another threshold value.

5. The method as recited in claim 4 wherein said another threshold value is greater than said first threshold value.

6. The method as recited in claim 1 wherein step d) alters at least one color component color value to a maximum color value therefor.

7. A memory media for controlling a computer to correct a color shift resulting from a color scan mechanism, said memory media comprising:
   a. code means for controlling said computer to sense plural component color data derived from said color scan mechanism;
   b. code means for controlling said computer to determine if at least one color component value exhibits a value greater than a first threshold value;
   c. code means for controlling said computer to determine if another color component value exhibits a value greater than at least another threshold value;
   d. code means responsive to code means b) and c) determining that said at least one color component value exceeds said first threshold value and said another color component value exceeds said another threshold value, for controlling said computer to alter said at least one color component value to a predetermined color value so as to correct for said color shift; and
   e. wherein the code means for controlling said computer to alter comprises code means for controlling said computer to change the another color component value to the predetermined color value which comprises a fixed value which is independent of the plural component color data during the altering.

8. The memory media as recited in claim 7, wherein said plural color component data comprises bytes of red, green and blue color component values.

9. The memory media as recited in claim 7, wherein said at least one color component is a red color component.

10. The memory media as recited in claim 7, wherein said first threshold value is different from said another threshold value.

11. The memory media as recited in claim 10, wherein said another threshold value is greater than said first threshold value.

12. The memory media as recited in claim 7, wherein code means d) controls said computer to alter at least one color component color value to a maximum color value therefor.

13. The method as recited in claim 1, wherein the altering comprises altering said at least one color component value to the predetermined color value which comprises a fixed value which is independent of the plural component color data.

14. The method as recited in claim 1, wherein the first threshold value and the another threshold value comprise fixed values which are independent of the plural component color data.

15. The memory media as recited in claim 7, wherein the code means for controlling said computer to alter comprises code means for controlling said computer to alter said at least one color component value to the predetermined color value which comprises a fixed value which is independent of the plural component color data.

16. The memory media as recited in claim 7, wherein the first threshold value and the another threshold value comprise fixed values which are independent of the plural component color data.

* * * * *